(12) United States Patent
Choi et al.

(10) Patent No.: US 7,499,585 B2
(45) Date of Patent: Mar. 3, 2009

(54) APPARATUS AND METHOD FOR DESCRIBING 3-DIMENSIONAL IMAGE DATA AND APPARATUS AND METHOD FOR RETRIEVING 3-DIMENSIONAL IMAGE DATA

(75) Inventors: Yunjung Choi, Daejon (KR); Suk-Hee Cho, Daejon (KR); Kug-Jin Yun, Daejon (KR); Young-Kwon Hahm, Daejon (KR); Chieteuk Ahn, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 560 days.

(21) Appl. No.: 10/540,739

(22) PCT Filed: Dec. 24, 2003

(86) PCT No.: PCT/KR03/02840

§ 371 (c)(1),
(2), (4) Date: Jun. 24, 2005

(87) PCT Pub. No.: WO2004/059579

PCT Pub. Date: Jul. 15, 2004

(65) Prior Publication Data

US 2006/0088205 A1 Apr. 27, 2006

(30) Foreign Application Priority Data

Dec. 26, 2002 (KR) .................... 10-2002-0084542

(51) Int. Cl.
*G06K 9/00* (2006.01)
(52) U.S. Cl. ...................................... 382/154
(58) Field of Classification Search .................. 382/154
See application file for complete search history.

(56) References Cited

U.S. PATENT DOCUMENTS 5,431,161 A * 7/1995 Ryals et al. .................. 600/425

(Continued)

FOREIGN PATENT DOCUMENTS

JP 11003434 1/1999

(Continued)

OTHER PUBLICATIONS

'A Content-Based Search Engine for VRML Databases' Paquet et al., Computer Vision and Pattern Recognition, 1998 IEEE Computer Society Conference, Jun. 23-25, 1998, pp. 541-546.

(Continued)

*Primary Examiner*—Samir A Ahmed
*Assistant Examiner*—Michael Vanchy, Jr.
(74) *Attorney, Agent, or Firm*—Ladas & Parry LLP

(57) ABSTRACT

Provided is an apparatus and method for describing three-dimensional, image data, an apparatus and method for retrieving three-dimensional image data, and a computer-readable recording media for recording the programs. An object of the present invention is to provide an apparatus and method for describing three-dimensional image data, and a computer-readable recording-medium that implements the method. Another object of the present invention is to provide an apparatus and method for retrieving three-dimensional image data suitable for various application areas and display apparatuses, and a computer-readable recording-medium that implements the method. The image description apparatus includes: a descriptor database for storing descriptors describing characteristics of the three-dimensional image data; a descriptor adding unit for reading in a descriptor describing the characteristics of the three-dimensional image data and adding it to the three-dimensional image data; and a registration unit for registering the three-dimensional image data with the descriptor in a three-dimensional image data database.

18 Claims, 8 Drawing Sheets

U.S. PATENT DOCUMENTS

| | | | |
|---|---|---|---|
| 5,754,676 A | | 5/1998 | Komiya et al. |
| 6,084,978 A | * | 7/2000 | Taylor et al. ............... 382/154 |
| 6,408,321 B1 | * | 6/2002 | Platt ........................... 708/520 |
| 6,571,227 B1 | * | 5/2003 | Agrafiotis et al. ............ 706/15 |
| 6,631,364 B1 | * | 10/2003 | Rioux et al. ................... 707/2 |
| 7,209,571 B2 | * | 4/2007 | Davis et al. ................. 382/100 |
| 2006/0122467 A1 | * | 6/2006 | Harrington et al. .......... 600/300 |

FOREIGN PATENT DOCUMENTS

| | | |
|---|---|---|
| JP | 2000-099759 | 4/2000 |
| JP | 2000-187670 | 7/2000 |
| JP | 2000250942 | 9/2000 |
| JP | 2001325295 | 11/2001 |
| JP | 2002-095018 | 3/2002 |
| JP | 2002099556 | 4/2002 |
| KR | 20010002386 | 1/2001 |
| KR | 20010005452 | 1/2001 |
| KR | 10-20010026651 | 4/2001 |
| WO | WO 0067151 | 11/2000 |
| WO | 03/092304 A1 | 11/2003 |

OTHER PUBLICATIONS

Requirements for IMSV (Interactive Multi-viewpoint Stereoscopic Video) delivery system, Cho et al. (ISO/IEC JTC1/SC29/WG11 May 2002).

Draft Requirements for 3DAV (ISO/IEC JTC1/SC29/WG11 N4795, May 2002).

* cited by examiner

APPARATUS AND METHOD FOR DESCRIBING 3-DIMENSIONAL IMAGE DATA AND APPARATUS AND METHOD FOR RETRIEVING 3-DIMENSIONAL IMAGE DATA

TECHNICAL FIELD

The present invention relates to an apparatus and method for describing three-dimensional image data, an apparatus and method for retrieving three-dimensional image data, and a computer-readable recording medium for recording a program that implements the methods. More particularly, the apparatuses and methods of the present invention can retrieve three-dimensional image data rapidly and precisely by describing the three-dimensional image data with descriptors at steps of acquiring, representing and displaying the three-dimensional image data.

BACKGROUND ART

A conventional apparatus for describing and retrieving an image object with its shapes and a method thereof are disclosed in International Publication Patent No. WO00/67151. The conventional retrieval method retrieves an image object by describing the shape of the image object. It is developed taking notice that although an image object is shown in three-dimensional in video, it is, in fact, formed of two-dimensional images projected on a plane.

The two-dimensional shape or outline of an image object depends on a point of view, an angle of view, camera, and parameters of an optical system. The fact that the image object has different outlines according to different viewpoints is used as a descriptor. To retrieve an image object in an image retrieval system, the user inputs queries by presenting the image object to the image retrieval system or in selecting a view of the image object.

Then, the image retrieval system outputs representations for the queried image object, compares the query image object with the image objects stored in a database, and outputs an image object most closely matched with the query image object. The above-mentioned patent is technology used in description and retrieving steps after the image object is produced in computer graphics (CG) or a three-dimensional image object having multi-view data. Therefore, it can be used as a substructure of the present invention in certain applications.

Also, Korean Patent Laid-Open No. 10-2002-0059951 suggests a method for retrieving an image based on combinations of color and texture, which improves performance in image retrieval by combining characteristics of colors and textures appropriately. By combining the retrieved images with color and texture data, images more appropriate for human visual sense can be obtained. Also, more precise retrieval is possible by retrieving the image according to areas. The cited Korean Patent uses color characteristics and texture as a standard for classifying images, and it is limited to classification and description of two-dimensional images. Therefore, it can be also used as a substructure of the present invention to precisely retrieve the three-dimensional images retrieved in the present invention.

Another prior art, International Publication Patent No. WO00/46695, discloses descriptors for a video sequence and an image retrieval system using the descriptors. In the patent, motions of camera, observer and observing devices in the frames of a video sequence are expressed with descriptors from a video indexing view point. That is, the forms of fixing, panning, tracking, tilting, zooming, rolling, and other motions are divided and directed by two components, which indicate two different directions. Their values are expressed in histogram corresponding to a predetermined size of displacement. Just as the Korean Patent No. 10-2001-0001130, this invention is a technology based on the characteristics of two-dimensional images.

Normally, two-dimensional images are classified based on color formats, screen ratio and screen size and, after encoding, they are described based on the encoding method. Currently, image standardization groups, such as the Moving Picture Experts Group and the Joint Photographics Experts Group (JPEG), categorize profiles and levels of images based on color format, screen ratio and screen size of an image and select images suitable for each application area.

However, three-dimensional images are what a concept of multi-view or space is added to conventional two-dimensional image or a concept of computer graphics. Three-dimensional images with an additional viewpoint give cubical effect and panorama images obtained by mosaicking images of sequential viewpoints. Three-dimensional images adopting the concept of space can provide images at different angles at the same time.

In short, three-dimensional images can be provided in various forms according to what concept is added to a two-dimensional image and how the image is processed and displayed. Therefore, a systematic three-dimensional image description method and an image retrieval method based on the description method are required necessarily to retrieve three-dimensional images effectively in various application areas and to convert and exchange the images suitably to each application area and display apparatus.

However, the image classification method and the image description and retrieval method of prior arts, which are described above, are used limitedly to two-dimensional images. A classification structure and descriptors that are effective to classify three-dimensional images are not suggested in any prior art yet.

DISCLOSURE OF INVENTION

It is, therefore, an object of the present invention to provide an apparatus and method for describing three-dimensional image data that are scattered due to the diversity at an image acquisition step, an image representing step and an image display step, systematically, and a computer-readable recording-medium that implements the method.

It is another object of the present invention to provide an apparatus and method for retrieving three-dimensional image data suitable for various application areas and display apparatuses rapidly and systematically to convert and exchange the image data upon the request of a user, and a computer-readable recording-medium that implements the method.

In accordance with one aspect of the present invention, there is provided an apparatus for describing three-dimensional image data, including: a descriptor database for storing descriptors describing characteristics of the three-dimensional image data at an acquisition procedure, a representing procedure, and a display procedure; a descriptor adding unit for reading in a descriptor describing the characteristics of the three-dimensional image data inputted from outside at each step and adding the descriptor to the three-dimensional image data; and a registration unit for registering the three-dimensional image data with the descriptor endowed by the descriptor adding unit in a three-dimensional image data database.

In accordance with one aspect of the present invention, there is provided a method for describing three-dimensional image data, including the steps of: a) a descriptor adding unit recognizing characteristics of the three-dimensional image data at an acquisition procedure, a representing procedure, and a display procedure; b) the descriptor adding unit reading in descriptors for describing characteristics of the three-dimensional image data at each step based on the recognition from a descriptor database; c) the descriptor adding unit adding the descriptors to the three-dimensional image data; and d) the descriptor adding unit registering the three-dimensional image data endowed with the descriptors in a three-dimensional image data database.

In accordance with one aspect of the present invention, there is provided a computer-readable recording media for recording a program that implements a three-dimensional image data description method in a three-dimensional image data description provided with a processor, including the steps of: a) a descriptor adding unit recognizing characteristics of the three-dimensional image data at an acquisition procedure, a representing procedure, and a display procedure; b) the descriptor adding unit reading in descriptors for describing characteristics of the three-dimensional image data at each step based on the recognition from a descriptor database; c) the descriptor adding unit adding the descriptors to the three-dimensional image data; and d) the descriptor adding unit registering the three-dimensional image data endowed with the descriptors in a three-dimensional image data database.

In accordance with one aspect of the present invention, there is provided an apparatus for retrieving three-dimensional image data, including: an input unit for receiving data on characteristics of the three-dimensional image data from a user at an acquisition procedure, a representing procedure, and a display procedure; a descriptor database for storing descriptors based on the characteristics of the three-dimensional image data at the acquisition procedure, the representing procedure, and the display procedure; a descriptor abstraction unit for abstracting out of the descriptor database a descriptor corresponding to the data inputted from the input means; a descriptor comparison unit for comparing the descriptor abstracted from the descriptor abstraction unit with descriptors of three-dimensional image data stored in a three-dimensional image data database, and retrieving three-dimensional image data matched with the abstracted descriptor; and an output unit for outputting the three-dimensional image data retrieved by the descriptor comparison unit to the user.

In accordance with one aspect of the present invention, there is provided a method for retrieving three-dimensional image data, including the steps of: a) receiving data on characteristics of the three-dimensional image data to be retrieved from a user at an acquisition procedure, a representing procedure, and a display procedure; b) a descriptor abstracting unit abstracting a descriptor matched with the inputted data out of a descriptor database that stores descriptors matched with the characteristics of the three-dimensional image data at the acquisition procedure, the representing procedure, and the display procedure; c) a descriptor comparison unit comparing the abstracted descriptor with descriptors of three-dimensional descriptors stored in a three-dimensional image data database and retrieving three-dimensional image data matched with the abstracted descriptor; and d) an output unit outputting the three-dimensional image data retrieved by the descriptor comparison unit.

In accordance with one aspect of the present invention, there is provided a computer-readable recording medium for recording a program that implements a three-dimensional image data retrieval method in a three-dimensional image data retrieving apparatus provided with a processor, including the steps of: a) receiving data on characteristics of the three-dimensional image data to be retrieved from a user at an acquisition procedure, a representing procedure, and a display procedure; b) a descriptor abstracting unit abstracting a descriptor matched with the inputted data out of a descriptor database that stores descriptors matched with the characteristics of the three-dimensional image data at each step[image retrieving step?]; c) a descriptor comparison unit comparing the abstracted descriptor with descriptors of three-dimensional descriptors stored in a three-dimensional image data database and retrieving three-dimensional image data matched with the abstracted descriptor; and d) an output unit outputting the three-dimensional image data retrieved by the descriptor comparison unit.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Figure 1:
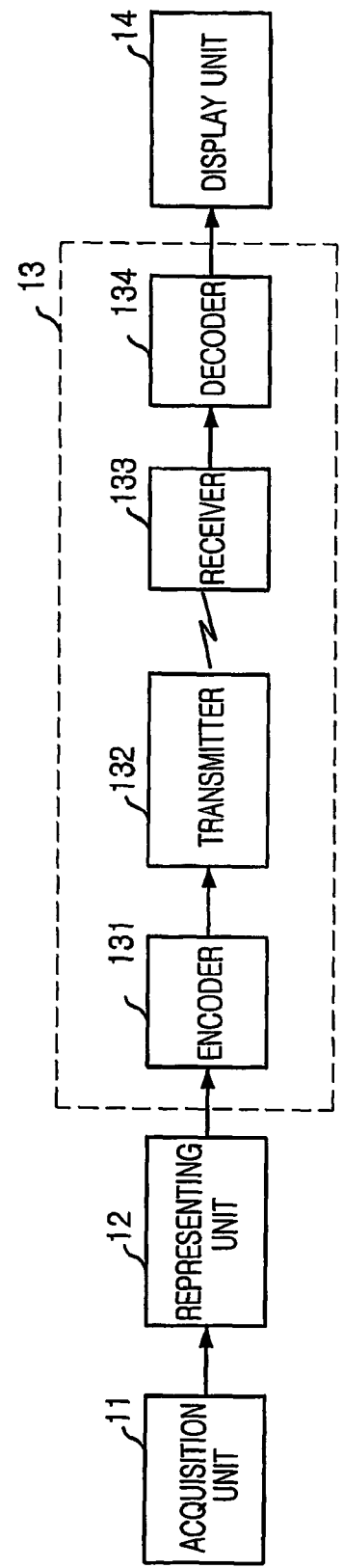
FIG. 1 is a block diagram describing three-dimensional image data processing system in accordance with the present invention.

Other objects and aspects of the invention will become apparent from the following description of the embodiments with reference to the accompanying drawings, which is set forth hereinafter.

Encoding of three-dimensional image data requires a representing algorithm to convert the three-dimensional image data, which are obtained and recorded in diverse forms, into proper forms that can be inputted into an encoder. For example, when three-dimensional image data are compressed by a two-dimensional image encoding method, a right-eye image and a left-eye image acquired by a stereo camera in the conventional two-dimensional image representing method can be used for the encoder if they are expanded so as to receive a plurality of inputs.

However, three-dimensional image data acquired by an omni-directional camera and stored in an image-based representing (IBR) method have a geometrical structure different from that of the conventional two-dimensional image data. Therefore, they should be converted to have the same geometrical structure as the conventional two-dimensional image data to be inputted to the encoder.

Also, when the three-dimensional image data stored in a database and exchanged on a network are retrieved at the retrieving procedure or carried out Universal Multimedia Access (UMA), if its structure is not suitable for a user's encoder, it becomes useless image data. Therefore, when three-dimensional image data need to be processed and used in a particular application, classification by the rending method is required necessarily. Therefore, the representing method at the image representing step should be used as a standard for classifying three-dimensional image data.

At the image display step, various display apparatuses are used according to application areas. Largely, there are two types: Two-dimensional display apparatuses (i.e., monoscopic display apparatuses) and stereoscopic display apparatuses. When image data are acquired by a camera that can provide depth information at an image acquisition step, the image data can have a cubic effect. Although three-dimensional image data are suitable for two-dimensional display, if an image representing method is used to supports image conversion into a stereoscopic type, the three-dimensional image data are used for a stereo display apparatus.

Therefore, a user having a stereo display should refer to classification items at the image acquisition unit and an image representing unit to retrieve three-dimensional image data suitable for the stereo display apparatus. However, since the acquisition and representing method of the three-dimensional image data are diverse, it is an inefficient work requiring a long time for the user to find all combinations of descriptors suitable for his stereo display apparatus. If the user is not skilled in the image retrieve, the accuracy of the retrieval is barely guaranteed.

This is the reason why the types of stereo display apparatus and two-dimensional display apparatus should be included in the classification of three-dimensional images. This way, those who are not familiar with retrieving and using three-dimensional image data can retrieve and enjoy three-dimensional image data suitable for their display apparatuses.

In the present invention, three-dimensional images, which are used for various application areas, are classified into image acquisition procedure, image representing procedure and image display procedure. Each procedure uses individual descriptors. On the other hand, if there is a combination of descriptors which is frequently used, the descriptor is defined as a new descriptor and used as an integrated descriptor.

Three-dimensional image data, which give multi-view or a cubical effect to the user, are obtained by acquiring moving pictures in various viewpoints and using diverse image processing methods. The three-dimensional images are used in various areas, such as sports broadcasting, advertisement, education and medical services. The kind of the data for the three-dimensional images is different according to each application area. The three-dimensional image data used in the present invention includes:

1. image data with wide visual field,
2. image data with multi-view points, and
3. stereo image data with a cubic effect.

The three-dimensional image defined in the present invention includes all forms of data that give an effect of multi-view points and a cubic effect which two-dimensional image data and computer graphics cannot provide.

FIG. 1 is a block diagram describing three-dimensional image data processing system in accordance with the present invention. Referring to FIG. 1, a three-dimensional image processing system includes an acquisition unit 11, a representing unit 12, a transceiver 13 and a display unit 14.

In the acquisition unit, diverse forms of three-dimensional image data are acquired. In the representing unit 12, the acquired three-dimensional image data are processed into a form suitable to be processed in an encoder 131 or in the display unit 14. Meanwhile, the transceiver 13 transmits and receives the three-dimensional image data processed in the representing unit 12 to transmit them to a user. The display unit 14 outputs the image data to the user finally.

Therefore, when three-dimensional image data are provided to the user through a network, they go through following processes. The image data outputted from the representing unit 12 are compressed in the encoder 131 and transmitted through a transmission unit 132. Then, the image data are received by a receiver 133, decoded in a decoder 134, and inputted to the display unit 14, which outputs the image data to the user finally.

As described above, all three-dimensional image data pass through the acquisition unit, the representing unit, and the display unit. Therefore, if three-dimensional image data are classified using proper descriptors at each image processing step, they can be retrieved more rapidly and precisely.

When the three-dimensional image data are classified and described as above, three-dimensional image data descriptors can be formed of a combination of an acquisition descriptor, a representing descriptor and a display descriptor.

Figure 2:
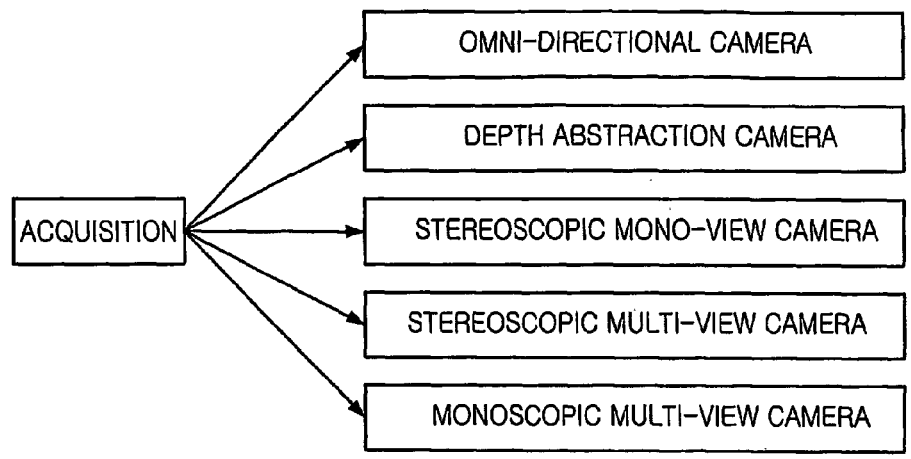
FIG. 2 is a diagram showing a step of acquiring three-dimensional image data in accordance with the present invention.

FIG. 2 is a diagram showing a step of acquiring three-dimensional image data in accordance with the present invention. Referring to FIG. 2, the description at the image acquisition procedure includes an omni-directional camera, a depth abstraction camera, a stereoscopic mono-view camera, a stereoscopic multi-view camera and a monoscopic multi-view camera.

Figure 3:
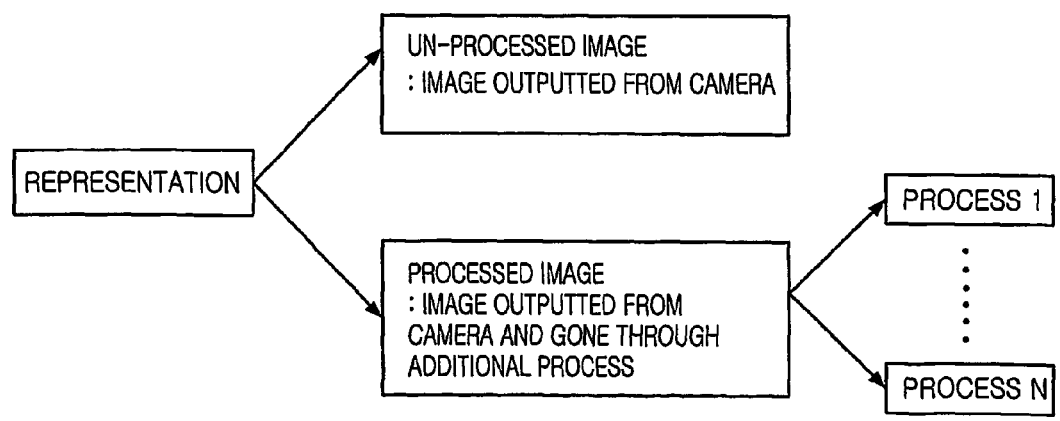
FIG. 3 is a diagram illustrating a step of representing three-dimensional image data in accordance with the present invention.

FIG. 3 is a diagram illustrating a step of representing three-dimensional image data in accordance with the present invention. Referring to FIG. 3, the representing of three-dimensional image data can be divided into un-processed images and processed images and then described. That is, among the cameras used for acquiring three-dimensional image data, there is a camera such as the omni-directional camera that represents the image data in a form not suitable for standard encoding tools, e.g., MPEG and JPEG.

In this case, if the user wants to encode the three-dimensional image data in his encoder, an additional process should be performed necessarily. So, the three-dimensional image data that have gone through the additional process before the input of the image data exist in the encoder. Image data for encoding are either processed image data that have gone through the additional process or un-processed image data that are represented as outputted from the camera. In the processed image data, if the image processing method is used as a descriptor, the descriptor can be used usefully when the representing method of the retrieved three-dimensional image is converted or inverse-converted.

Figure 4:
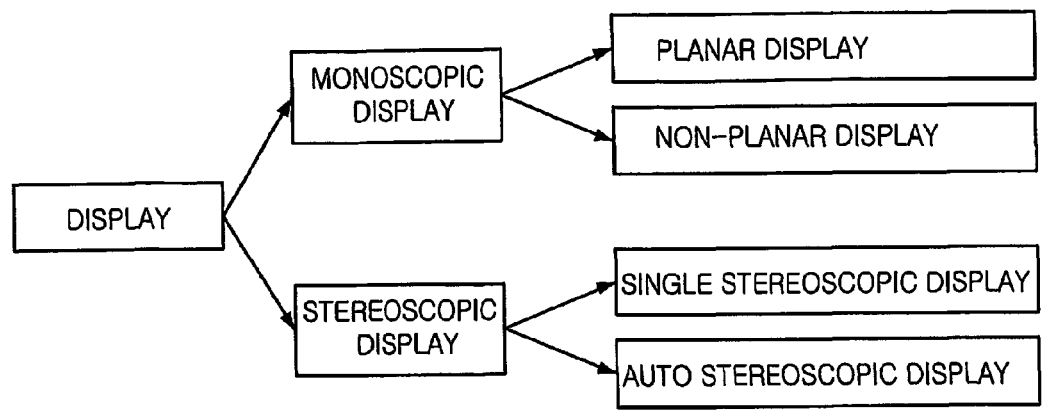
FIG. 4 is a diagram showing a step of displaying three-dimensional image data in accordance with the present invention.

FIG. 4 is a diagram showing a step of displaying three-dimensional image data in accordance with the present invention. Normally, the three-dimensional image data acquired and represented suitably for the stereo display apparatus shows quite good compatibility with a monoscopic display apparatus. However, the three-dimensional image data acquired and represented suitably for a monoscopic display apparatus requires an additional process to output the image data to a stereoscopic display apparatus.

Therefore, as shown in FIG. 4, a descriptor for representing a monoscopic display apparatus or a stereoscopic display apparatus can be used as a display descriptor. Monoscopic display can be divided into planar display and non-planar display. Each display can be represented by a descriptor. Also, stereoscopic display can be divided into single stereoscopic display and auto stereoscopic display. Each stereoscopic display can be represented by a descriptor, too.

Figure 5:
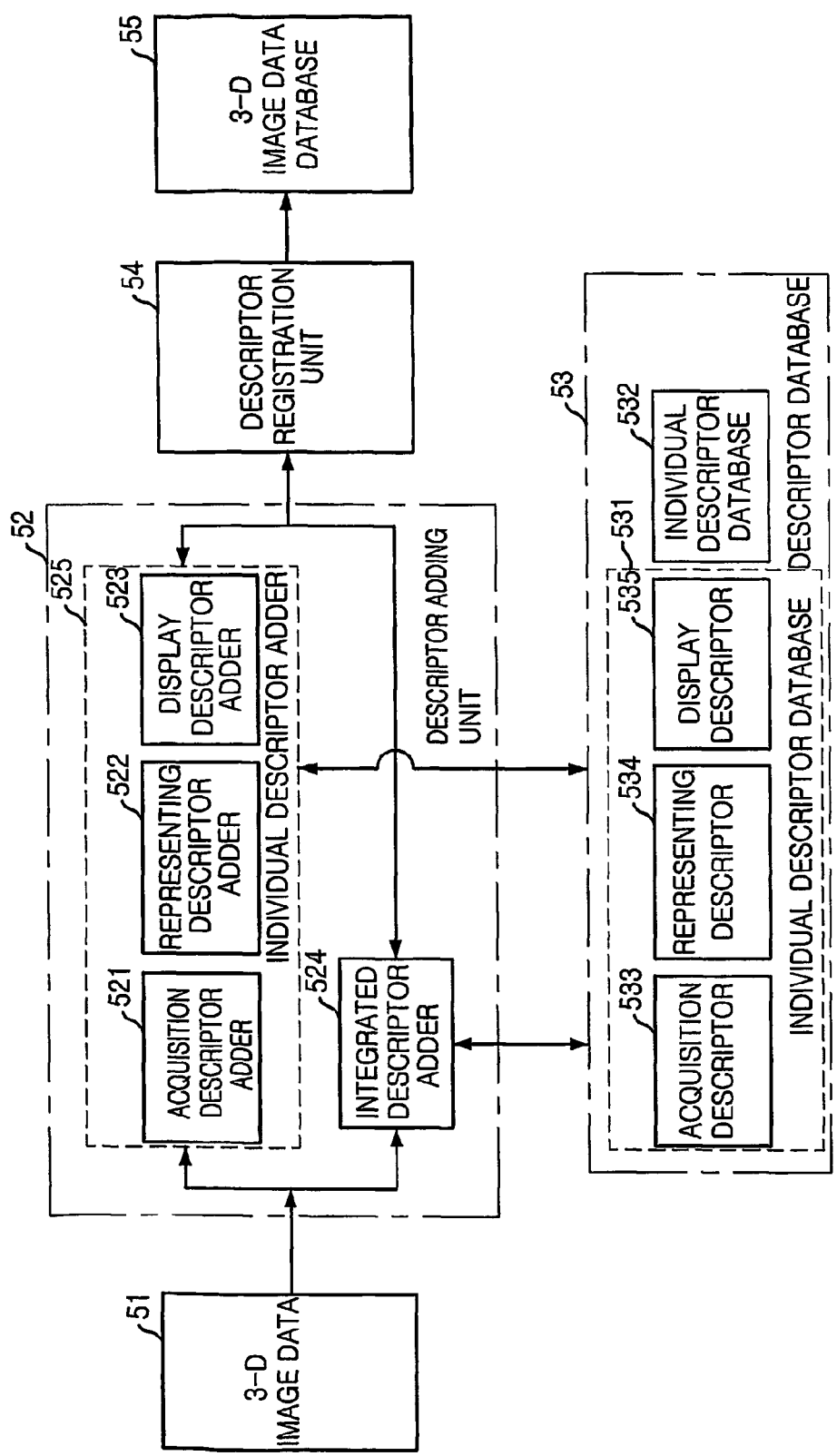
FIG. 5 is a block diagram illustrating an apparatus for describing three-dimensional image data in accordance with an embodiment of the present invention.

FIG. 5 is a block diagram illustrating an apparatus for describing three-dimensional image data in accordance with an embodiment of the present invention. Referring to FIG. 5, a three-dimensional image data description apparatus of the present invention includes a descriptor database 53, a descriptor adding unit 52, and a descriptor registration unit 54.

The descriptor database 53 for stores an acquisition descriptor, a representing descriptor, and a display descriptor that represent three-dimensional image data. The descriptor adding unit 52 reads in from the descriptor database 53 the descriptors that can describe the characteristics of the three-dimensional image data at the acquisition step, the representing step and the display step. The descriptor registration unit 54 registers the three-dimensional image data endowed with the descriptors at the descriptor adding unit 52 in a three-dimensional image database 55.

The descriptor adding unit 52 includes an acquisition descriptor adder 521, a representing descriptor adder 522, and a display descriptor adder 523. The acquisition descriptor adder 521 reads in the acquisition descriptor that describes the acquisition step of the three-dimensional image data from the descriptor database 53 and adds it to the three-dimensional image data. The representing descriptor adder 522 reads in the representing descriptor that describes the representing step of the three-dimensional image data from the descriptor database 53 and adds it to the three-dimensional image data. The display descriptor adder 523 reads in the display descriptor that describes the display step of the three-dimensional image data from the descriptor database 53 and adds it to the three-dimensional image data.

The descriptor adding unit 52 further includes an integrated descriptor adder 524 that reads in an integrated descriptor from an integrated descriptor database 532 and adds it to the three-dimensional image data. The descriptor database 53 includes an individual descriptor database 531 for storing the acquisition descriptor 533 for describing the step of acquiring the three-dimensional image data, the representing descriptor 534 for describing the step of representing the three-dimensional image data, and the display descriptor 535 for describing the step of displaying the three-dimensional image data.

The descriptor database 53 further includes an integrated descriptor database 532 for storing the integrated descriptor which is defined as a particular combination of the acquisition descriptor 533, the representing descriptor 534, and the display descriptor 535.

For example, three-dimensional image data are acquired by an omni-directional camera, represented in light fields mapping (LFM) and displayed in a monoscopic panorama method. Here, the omni-directional camera is described in the acquisition descriptor 533 and added to the three-dimensional image data, because it is a device corresponding to the acquisition unit. The LFM is described in the representing descriptor 534 and added to the three-dimensional image data, because it is a method corresponding to the representing unit. The monoscopic panorama method is described in the display descriptor 535 and added to the three-dimensional image data, because it is data corresponding to the display unit.

The descriptor adding unit 52 reads in the individual descriptor or the integrated descriptor from the descriptor database 53 and adds it to the three-dimensional image data according to each step where the three-dimensional image data are acquired, represented, or displayed.

In the descriptor database 53, the individual descriptor and the integrated descriptor are stored. In the individual descriptor database 531, the acquisition descriptor 533, the representing descriptor 534 and the display descriptor that are added at each unit, i.e., the acquisition unit, the representing unit or the display unit.

The descriptor adding unit 52 reads in a proper descriptor among the descriptors from the descriptor database 53, and adds it to the three-dimensional image data desired to be described. Here, the descriptor is added based on the characteristics inputted during the production or distribution of image data. However, it is possible to refer to and input a descriptor predefined in the descriptor database 53.

Meanwhile, it is possible to define an integrated descriptor for a combination of three abstracted descriptors in the descriptor database 53. When the three-dimensional image data are matched with the definition of an integrated descriptor, an integrated descriptor adder 524 reads in the integrated descriptor from the integrated descriptor database 532 and adds it to the three-dimensional image data. In case where there is no predefined integrated descriptor, the process of adding an integrated descriptor may be skipped.

After a proper descriptor is added to the three-dimensional image data, the three-dimensional image data with the descriptor is registered in a three-dimensional image data database 55 by a descriptor registration unit 54 in the three-dimensional image data description apparatus.

Figure 6:
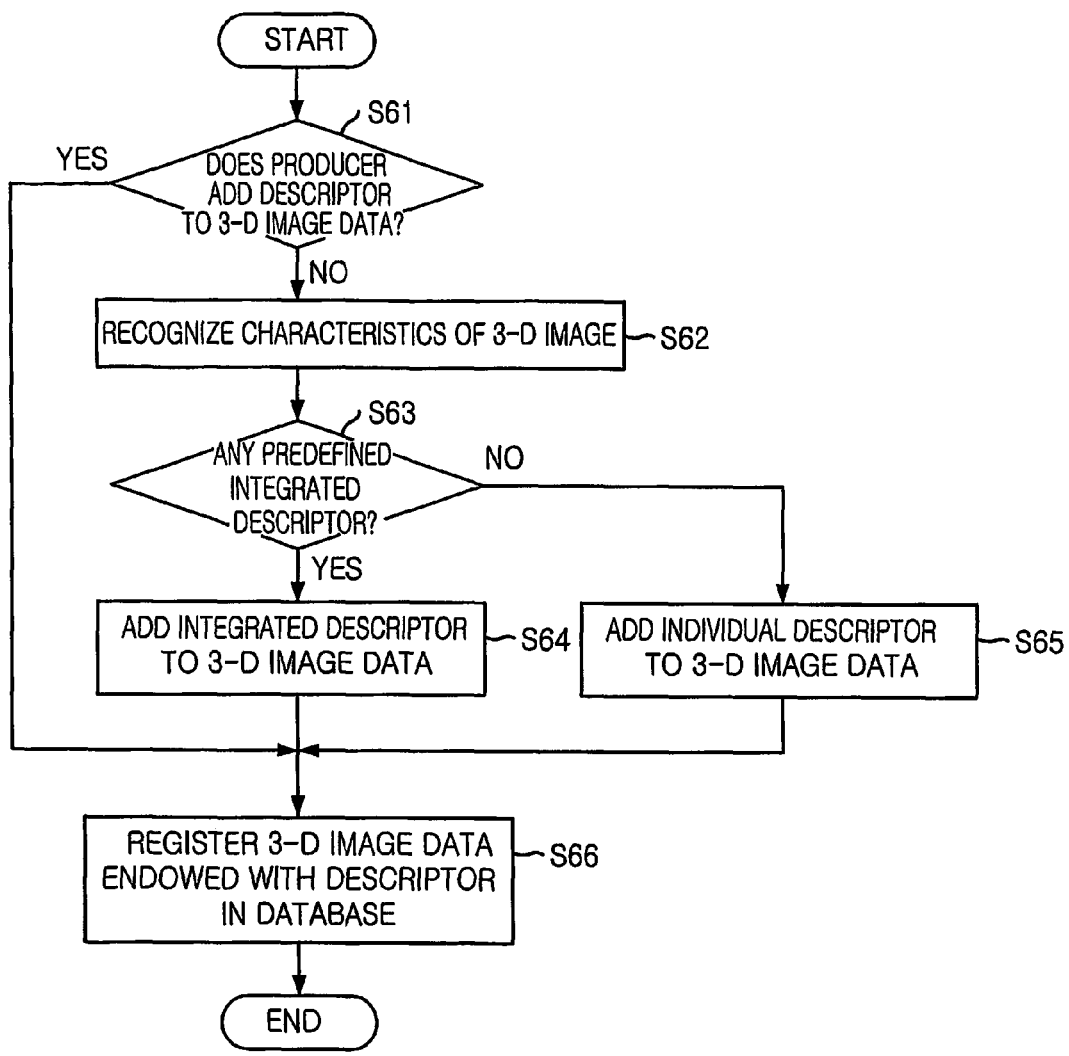
FIG. 6 is a flowchart describing a method for describing three-dimensional image data in accordance with an embodiment of the present invention.

FIG. 6 is a flowchart illustrating a method for describing three-dimensional image data in accordance with an embodiment of the present invention. Referring to FIG. 6, at step S61, the descriptor adding unit 52 determines if a producer has added a descriptor to the three-dimensional image data.

If the three-dimensional image data are already endowed with a descriptor, at step S66, the three-dimensional image data are registered in the three-dimensional image data database 55 by a descriptor registration unit 54. If the three-dimensional image data are not endowed with a descriptor, at step S62, the descriptor adding unit 52 figures out the characteristics of the three-dimensional image data to add a descriptor suitable for the image data.

Subsequently, at step 63, it is determined whether there is an integrated descriptor matched with the three-dimensional image data. If there is an integrated descriptor, at step S64, the integrated descriptor is added to the three-dimensional image data and, at step S66, the three-dimensional image data endowed with the integrated descriptor is registered in the three-dimensional image data database 55. If there is no such integrated descriptor, at step S65, an individual descriptor matched with the characteristics of the three-dimensional image data is added to the three-dimensional image data. At step S66, the three-dimensional image data endowed with the individual descriptor are registered in the three-dimensional image data database 55.

Figure 7:
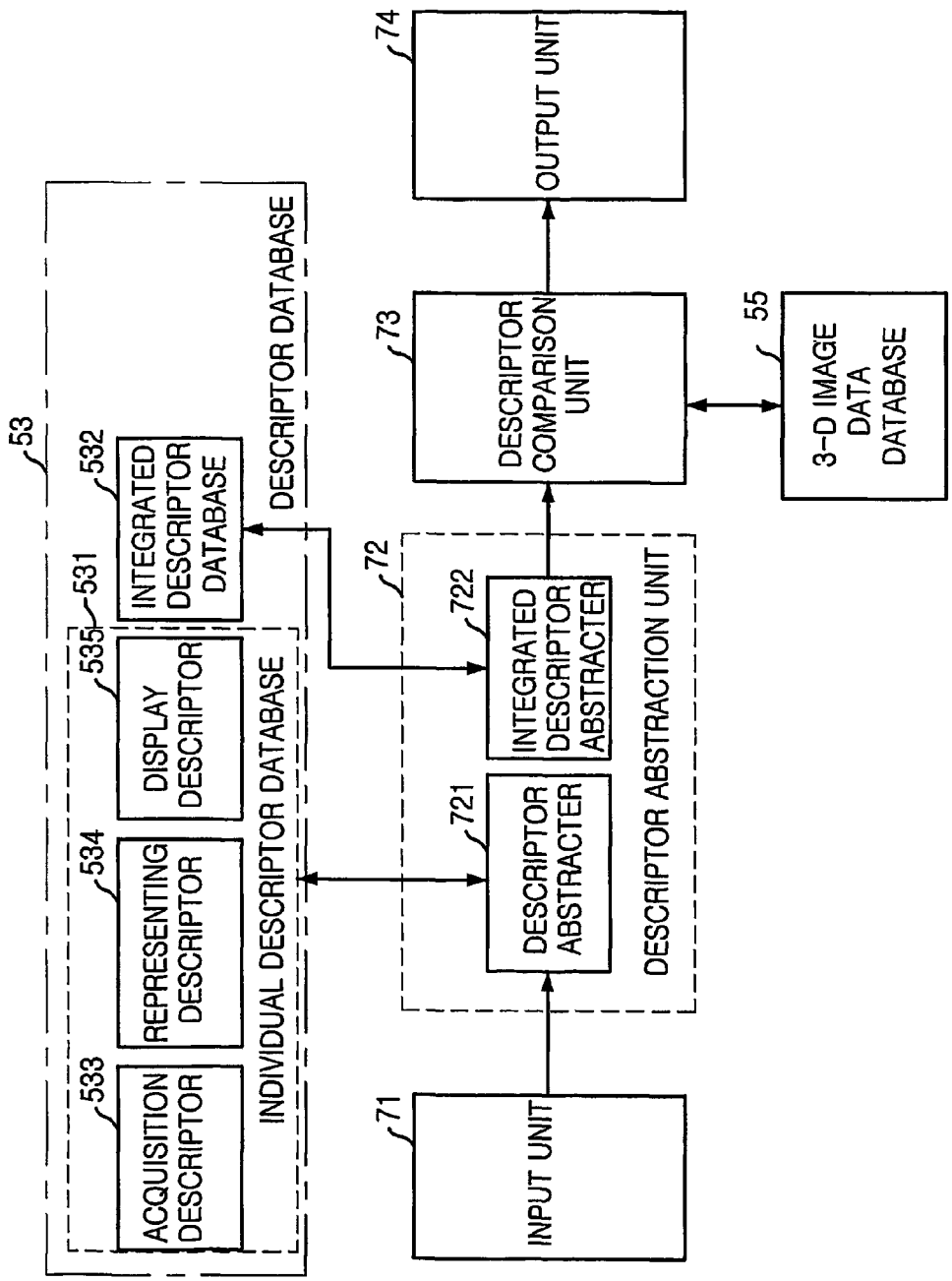
FIG. 7 is a block diagram depicting an apparatus for retrieving three-dimensional image data in accordance with an embodiment of the present invention.

FIG. 7 is a block diagram depicting an apparatus for retrieving three-dimensional image data in accordance with an embodiment of the present invention. Referring to FIG. 7, the three-dimensional image data retrieving apparatus of the present invention includes an input unit 71, the descriptor database 53, a descriptor abstraction unit 72, a descriptor comparison unit, and an output unit 74.

The input unit 71 receives the characteristics of the three-dimensional image data, such as the image acquisition method, the image representing method and the display method. The descriptor database 53 stores descriptors for describing the three-dimensional image data, such as the acquisition descriptor, the representing descriptor and the display descriptor. The descriptor abstraction unit 72 abstracts out of the descriptor database 53 a descriptor corresponding to the data transmitted from the input unit 71.

The descriptor comparison unit 73 compares the descriptor abstracted in the descriptor abstraction unit 72 with the descriptors of the three-dimensional image data which are stored in the three-dimensional image data database 55 and finds out three-dimensional image data matched with the abstracted descriptor. Then, the output unit 74 outputs the three-dimensional image data retrieved in the descriptor comparison unit 73 to the user.

An answer to a question inputted through the input unit 71 can be retrieved by inputting the type of three-dimensional image data needed at each step. For example, when a question on the image acquisition method, the representing method or the display method as image data is presented, the user inputs the necessary type of image data that the image acquisition method is 'omni-directional' and/or that the display method is 'panorama.' Here, an answer field for a particular question may remain in blank to request to retrieve all data without limiting the method of the question to a particular type.

Then, an individual descriptor abstracter 721 in the descriptor abstraction unit 72 abstracts individual descriptors matched with the answers to the question from the individual descriptor database 531 in the descriptor database 75. Meanwhile, in case where the answers to the questions are defined as an integrated descriptor, the integrated descriptor abstracter 722 in the descriptor abstraction unit 72 abstracts the integrated descriptor out of the integrated descriptor database 532 in the descriptor database 53. Here, the integrated descriptor is a descriptor defined as a combination of particular integrated descriptors.

The descriptor comparison unit 73 compares the descriptors to be retrieved with the descriptors of the three-dimensional image data in the three-dimensional image database 55 and retrieves three-dimensional image data matched with the descriptors to be retrieved. The retrieved three-dimensional image data are outputted through the output unit 74.

Figure 8:
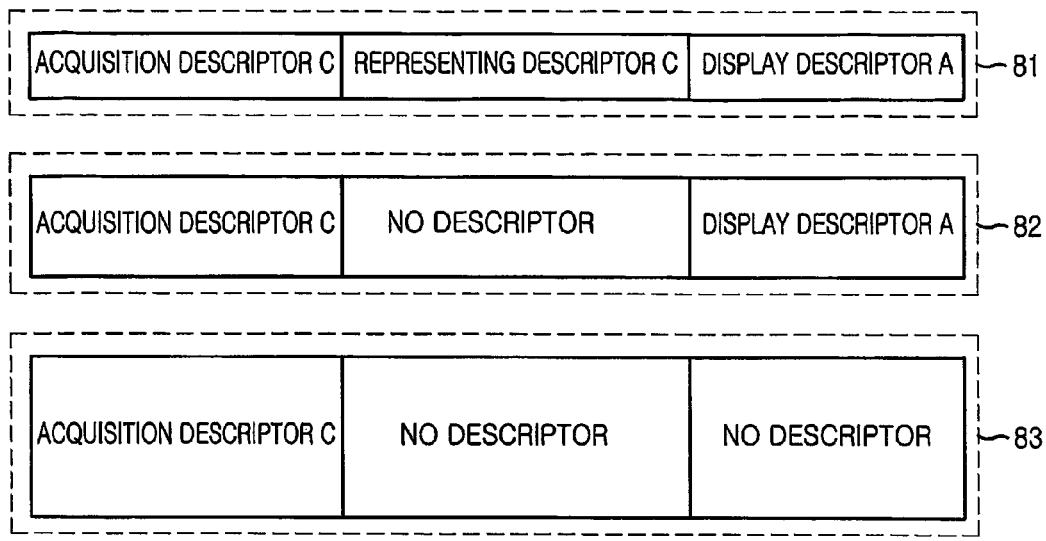
FIG. 8 is a diagram showing descriptor combinations in accordance with an embodiment of the present invention.

FIG. 8 is a diagram showing descriptor combinations in accordance with an embodiment of the present invention. The user can input an answer to a question on the type of the three-dimensional image data, such as the image acquisition method, the image representing method, and the display method. The user may not answer to one of the questions and may leave it in blank.

For instance, as shown in FIG. 8, at step S81, an acquisition descriptor C, a representing descriptor C, and a display descriptor A are abstracted based on the answers inputted by the user and expressed as a combination of descriptors. If the user answers to the image acquisition method and the display method but not to the representing method, at step S83, the three-dimensional image data to be retrieved are described with an acquisition C, no representing descriptor and a display descriptor A. Also, when the user answers to the image acquisition method only but not to the representing method and the display method, the three-dimensional image data to be retrieved are described only with the acquisition descriptor C.

As shown above, if the user does not answer to a question or if the descriptor abstraction unit 72 fails to abstract a descriptor from the descriptor database 53, all three-dimensional image data related to the step which is not given an answer are retrieved.

Figure 9:
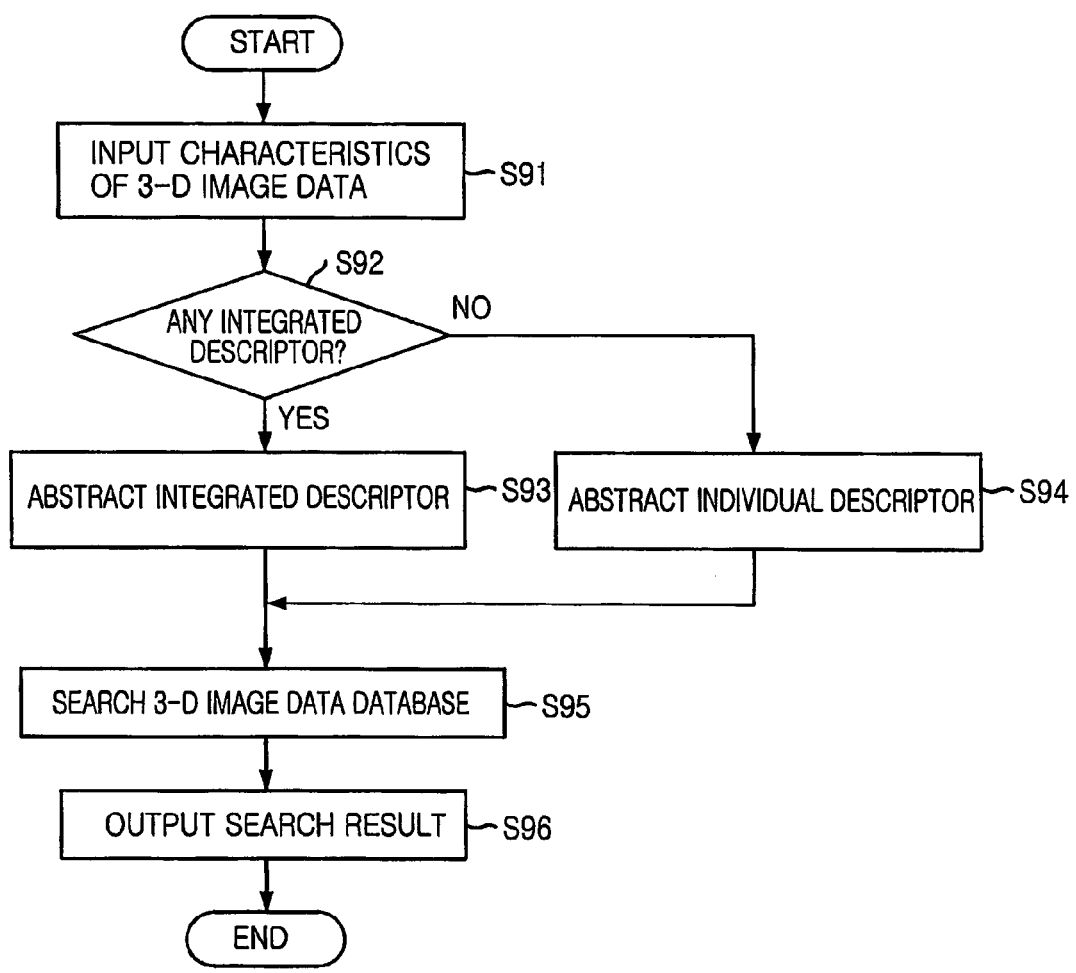
FIG. 9 is a flowchart describing a method for retrieving three-dimensional image data in accordance with an embodiment of the present invention.

FIG. 9 is a flowchart describing a method for retrieving three-dimensional image data in accordance with an embodiment of the present invention. Referring to FIG. 9, at step S91, the characteristics of the three-dimensional image data are inputted by answering to the questions presented through the input unit 71. At step S92, the descriptor abstraction unit 72 determines whether there is an integrated descriptor matched with the characteristics of the inputted image data.

If there is an integrated descriptor, at step S93, the descriptor abstraction unit 72 abstracts the integrated descriptor matched with the characteristics of the image data inputted by the user from the integrated descriptor database 532 in the descriptor database 53. If there is not such an integrated descriptor, at step S94, the descriptor abstraction unit 72 abstracts individual descriptors matched with the characteristics of the image data inputted by the user from the individual descriptor database 531 in the descriptor database 53.

Then, at step S95, the descriptor comparison unit 73 compares the abstracted individual descriptors with the descriptors in the three-dimensional image data database 55 and retrieves out three-dimensional image data matched with the characteristics inputted by the user. At step S96, the retrieved three-dimensional image data are outputted to the user through the output unit 74.

The methods of the present invention can be embodied as a program and stored in a computer-readable recording medium, such as CD-ROMs, RAMs, ROMs, floppy disks, hard disks, and magneto-optical disks. Since the process can be embodied by those skilled in the art without problems, description on it will be omitted.

As described above, the technology of the present invention can provide three-dimensional image data suitable for each application area and each display apparatus rapidly and precisely by describing three-dimensional image data scattered due to the diversity in the acquisition, representing and display steps systematically and by converting and exchanging the image data suitably for the user's request.

While the present invention has been described with respect to certain preferred embodiments, it will be apparent to those skilled in the art that various changes and modifications may be made without departing from the scope of the invention as defined in the following claims.

What is claimed is:

1. An apparatus for describing three-dimensional image data, comprising:
    a descriptor database for storing descriptors describing characteristics of the three-dimensional image data at an acquisition procedure, a representing procedure, and a display procedure;
    a descriptor adding means for reading in at least one of an acquisition descriptor, a representing descriptor, and a display descriptor describing the characteristics of the three-dimensional image data inputted from outside at each step and adding the descriptor to the three-dimensional image data; and
    a registration means for registering the three-dimensional image data with the descriptor endowed by the descriptor adding means in a three-dimensional image data database.

2. The apparatus as recited in claim 1, wherein the descriptor adding means includes:
    an acquisition descriptor adder for reading in the acquisition descriptor that describes a step of acquiring the three-dimensional image data from the descriptor database and adding the acquisition descriptor to the three-dimensional image data;
    a representing descriptor adder for reading in the representing descriptor that describes a step of representing the three-dimensional image data from the descriptor database and adding the representing descriptor to the three-dimensional image data; and a display descriptor adder for reading in the display descriptor that describes a step of displaying the three-dimensional image data from the descriptor database and adding the display descriptor to the three-dimensional image data.

3. The apparatus as recited in claim 2, wherein the descriptor database includes an individual descriptor database that stores the acquisition descriptor for describing the step of acquiring the three-dimensional image data, the representing descriptor for describing the step of representing the three-dimensional image data, and the display descriptor for describing the step of displaying the three-dimensional image data.

4. The apparatus as recited in claim 3, wherein the descriptor database further includes an integrated descriptor database that stores integrated descriptors defined as a particular combination of the acquisition descriptor, the representing descriptor and the display descriptor, and wherein the descriptor adding means further includes an integrated descriptor adder for reading in an integrated descriptor from the integrated descriptor database and adding the integrated descriptor to the three-dimensional image data.

5. A method for describing three-dimensional image data, comprising the steps of:

a) a descriptor adding unit recognizing characteristics of the three-dimensional image data at an acquisition procedure, a representing procedure, and a display procedure;

b) the descriptor adding unit reading in at least one of an acquisition descriptor, a representing descriptor, and a display descriptor for describing characteristics of the three-dimensional image data at each step based on the recognition from a descriptor database;

c) the descriptor adding unit adding the descriptors to the three-dimensional image data; and d) the descriptor adding unit registering the three-dimensional image data endowed with the descriptors in a three-dimensional image data database.

6. The method as recited in claim 5, wherein, at step a), the descriptor adding unit recognizes characteristics of steps of acquiring, representing, and displaying the three-dimensional image data and, at step b), the descriptor adding unit reads in the acquisition descriptor for describing the acquisition procedure the representing descriptor for describing the representing procedure, and the display descriptor for describing the display procedure based on the recognition.

7. The method as recited in claim 6, further including the steps of:

e) the descriptor adding unit determining whether there is an integrated descriptor defined as a particular combination of the acquisition descriptor, the representing descriptor, and the display descriptor; and f) the descriptor adding unit reading in the integrated descriptor from an integrated descriptor database and adding the integrated descriptor to the three-dimensional image data.

8. A computer-readable recording media for recording a program that implements a three-dimensional image data description method in a three-dimensional image data description provided with a processor, comprising the steps of:

a) a descriptor adding unit recognizing characteristics of the three-dimensional image data at an acquisition procedure, a representing procedure, and a display procedure;

b) the descriptor adding unit reading in at least one of an acquisition descriptor, a representing descriptor, and a display descriptor for describing characteristics of the three-dimensional image data at each step based on the recognition from a descriptor database;

c) the descriptor adding unit adding the descriptors to the three-dimensional image data; and d) the descriptor adding unit registering the three-dimensional image data endowed with the descriptors in a three-dimensional image data database.

9. The computer-readable recording media as recited in claim 8, further including the steps of:

e) the descriptor adding unit determining whether there is an integrated descriptor defined as a particular combination of the acquisition descriptor, the representing descriptor, and the display descriptor; and f) the descriptor adding unit reading in the integrated descriptor from an integrated descriptor database and adding the integrated descriptor to the three-dimensional image data.

10. An apparatus for retrieving three-dimensional image data, comprising:

an input means for receiving data on characteristics of the three-dimensional image data from a user at an acquisition procedure, a representing procedure, and a display procedure;

a descriptor database for storing descriptors based on the characteristics of the three-dimensional image data at the acquisition procedure, the representing procedure, and the display procedure;

a descriptor abstraction means for abstracting out of the descriptor database at least one of an acquisition descriptor, a representing descriptor, and a display descriptor corresponding to the data inputted from the input means;

a descriptor comparison means for comparing the descriptor abstracted from the descriptor abstraction means with descriptors of three-dimensional image data stored in a three-dimensional image data database, and retrieving three-dimensional image data matched with the abstracted descriptor; and an output means for outputting the three-dimensional image data retrieved by the descriptor comparison means to the user.

11. The apparatus as recited in claim 10, wherein the descriptor abstraction means includes an individual descriptor abstracter for abstracting individual descriptors, which include the acquisition descriptor for describing a step of acquiring the three-dimensional image data, the representing descriptor for describing a step of representing the three-dimensional image data, and the display descriptor for describing a step of displaying the three-dimensional image data, from the descriptor database.

12. The apparatus as recited in claim 11, wherein the descriptor database includes an individual descriptor database for storing the acquisition descriptor for describing a step of acquiring the three-dimensional image data, the representing descriptor for describing a step representing the three-dimensional image data, and the display descriptor for describing a step of displaying the three-dimensional image data.

13. The apparatus as recited in claim 12, wherein the descriptor database further includes an integrated descriptor database for storing integrated descriptors each of which is defined as a particular combination of the acquisition descriptor, the representing descriptor and the display descriptor, and
   wherein the descriptor abstraction means further includes
      an integrated descriptor abstracter for abstracting out of the integrated descriptor database an integrated descriptor corresponding to the data inputted from the input means.

14. A method for retrieving three-dimensional image data, comprising the steps of:
   a) receiving data on characteristics of the three-dimensional image data to be retrieved from a user at an acquisition procedure, a representing procedure, and a display procedure;
   b) a descriptor abstracting unit abstracting at least one of an acquisition descriptor, a representing descriptor, and a display descriptor matched with the inputted data out of a descriptor database that stores descriptors matched with the characteristics of the three-dimensional image data at the acquisition procedure, the representing procedure, and the display procedure;
   c) a descriptor comparison unit comparing the abstracted descriptor with descriptors of three-dimensional descriptors stored in a three-dimensional image data database and retrieving three-dimensional image data matched with the abstracted descriptor; and
   d) an output unit outputting the three-dimensional image data retrieved by the descriptor comparison unit.

15. The method as recited in claim 14, wherein the characteristics of the three-dimensional image data to be retrieved are inputted by the user at the image acquisition step, the image representing step, and the image display step in the step a) and
   wherein the descriptor abstracting unit abstracts descriptors matched with the data inputted from the descriptor database that stores the acquisition descriptor for describing the image acquisition step, the representing descriptor for describing the image representing step, and the display descriptor for describing the image display step in the step b).

16. The method as recited in claim 15, further including the steps of:
   e) the descriptor abstracting unit determining whether there is an integrated descriptor which is defined as a particular combination of the acquisition descriptor, the representing descriptor, and the display descriptor; and
   f) the descriptor abstracting unit abstracting the integrated descriptor out of an integrated descriptor database based on the result of the step e).

17. A computer-readable recording medium for recording a program that implements a three-dimensional image data retrieving method in a three-dimensional image data retrieving apparatus provided with a processor, comprising the steps of:
   a) receiving data on characteristics of the three-dimensional image data to be retrieved from a user at an acquisition procedure, a representing procedure, and a display procedure:
   b) a descriptor abstracting unit abstracting at least one of an acquisition descriptor, a representing descriptor, and a display descriptor matched with the inputted data out of a descriptor database that stores descriptors matched with the characteristics of the three-dimensional image data at the acquisition procedure, the representing procedure, and the display procedure;
   c) a descriptor comparison unit comparing the abstracted descriptor with descriptors of three-dimensional descriptors stored in a three-dimensional image data database and retrieving three-dimensional image data matched with the abstracted descriptor; and
   d) an output unit outputting the three-dimensional image data retrieved by the descriptor comparison unit.

18. The computer-readable recording medium as recited in claim 17, further including the steps of:
   e) the descriptor abstracting unit determining whether there is an integrated descriptor which is defined as a particular combination of the acquisition descriptor, the representing descriptor, and the display descriptor; and
   f) the descriptor abstracting unit abstracting the integrated descriptor out of an integrated descriptor database based on the result of the step e).

* * * * *